Sept. 19, 1967 P. L. MORETON 3,343,039
ELECTRICAL PROTECTIVE RELAYS
Filed Sept. 9, 1963
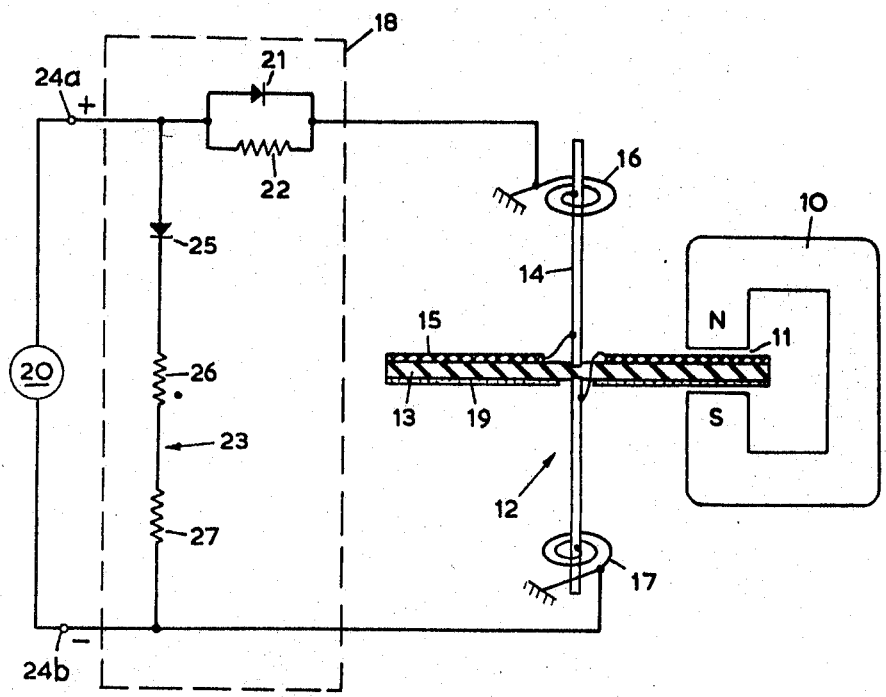

United States Patent Office 3,343,039
Patented Sept. 19, 1967

3,343,039
ELECTRICAL PROTECTIVE RELAYS
Peter Lewis Moreton, Felton, Somerset, England, assignor to The English Electric Company Limited, London, England, a British company
Filed Sept. 9, 1963, Ser. No. 307,732
Claims priority, application Great Britain, Sept. 11, 1962, 34,738/62
3 Claims. (Cl. 317—58)

This invention relates to electrical protective relays.

In protective relays, such as time/overcurrent relays, which are supplied with a unidirectional electric current whose magnitude is proportional to the magnitude of some monitored parameter, variations in the resistance of the relay winding carrying such current do not vary the magnitude of the current, but only the voltage to be developed by the source of the current. Thus in a relay having on its rotor a driving winding which co-operates with a magnetic flux to exert on the rotor a driving torque dependent on the magnitude of the current supplied to the driving winding, variations in the ambient temperature produce no corresponding variations in the driving torque exerted on the rotor.

However, where such a relay has an eddy current braking winding or other conducting means for exerting on the rotor a braking torque by virtue of the interaction of eddy currents induced in such braking winding on movement of the rotor and a constant magnetic flux, the braking torque serving to stabilise the speed of rotation in accordance with the magnitude of the driving torque, variations in the resistance of the braking winding (such as will arise from variations in the ambient temperature) give rise to corresponding variations in the braking torque.

Since these temperature-induced variations in the braking torque are not matched by corresponding temperature-induced variations in driving torque the speed of rotation of the rotor is subject to variation with variation of the ambient temperature. Similarly, the time taken for such a rotor to rotate from a predetermined starting position, through a predetermined angle, to a predetermined "operated" position is subject to variation dependent on the variation in ambient temperature. Thus the time delay before relay contacts close at the "operated" position is subject to variation with variation of ambient temperature.

In prior proposals attempts have been made to overcome this temperature dependence by modifying automatically the braking torque producing means in some manner in dependence upon ambient temperature so that the braking torque, like the driving torque, is uninfluenced by ambient temperature variations. The arrangements proposed have involved intricate mechanical devices, and these have been difficult to adjust and control.

The present invention seeks to compensate for the temperature dependent variation in braking torque by an entirely different method, namely by providing by electrical means corresponding ambient temperature dependent variations in driving torque; no attempt being made to modify the braking torque.

According to the present invention in an electrical protective time/overcurrent relay comprising a stationary constant magnetic flux producing means, a rotor co-operating with the said flux producing means and carrying a driving winding means connected with relay input terminals to receive a unidirectional electric current for exerting on the rotor a driving torque by virtue of interaction of such electric current and a magnetic flux produced by the said flux producing means, a braking winding means comprising an electrically conducting member for exerting on the rotor a braking torque by virtue of interaction of eddy currents induced in the said conducting member on movement of the rotor and a magnetic flux produced by the said flux producing means and relay contact operating means, and relay contact means operable by the relay contact operating means on rotation of the rotor into a predetermined "operated" position, an ambient temperature compensating means comprises an electric shunt circuit connected in parallel with the driving winding means and including an ambient temperature dependent resistance device for automatically varying the proportion of a relay input current supplied to the relay input terminals which is supplied to the driving winding means in dependence upon the ambient temperature in a manner similar to that in which the braking torque varies with variation in ambient temperature.

According to one preferred feature of the present invention such as aforesaid time/overcurrent relay may include a non-linear resistance device connected in the said shunt circuit for preventing the flow of any appreciable current in the said shunt circuit except when the relay input current exceeds a predetermined "pick-up" value at which rotation of the rotor from a starting position just commences.

According to another preferred feature of the present invention such an aforesaid time/overcurrent relay may also include in series with only the driving winding means a linear resistor for matching the voltage appearing across the said shunt circuit at the said pick-up value of relay input current to the voltage required across the said shunt circuit to cause the said non-linear resistance device to change from a state of high resistance to one of low resistance, and in parallel with the said linear resistor a non-linear resistance device for limiting the voltage that may be developed across the linear resistor whereby to restrict the burden of the relay for values of relay input current substantially greater than the said pick-up value, this second-mentioned non-linear resistance device exhibiting a high resistance value until the relay input current exceeds the pick-up value, and thereafter exhibiting a lower resistance value so long as the relay input current pick-up value is exceeded.

One electrical protective relay embodying the present invention will now be described by way of example, and with reference to the accompanying drawing.

The drawing shows diagrammatically the relevant electric circuit connections of the relay.

Referring now to the drawing, the electrical protective relay includes a magnet 10 for producing a stationary magnetic field in an air gap 11, and a rotor member 12 comprising a rotor disc 13 carried for rotation on a shaft 14 passing perpendicularly through the centre of the disc. The disc carries a rotor winding 15 applied thereto by one of the so-called printed circuit techniques, and the disc is positioned so that it projects into the air gap, the rotor winding intersecting the stationary magnetic flux in the air gap. Thus when a current flows in the rotor winding, it interacts with the magnetic flux so as to exert on the winding and hence on the disc a driving torque dependent on the magnitude of this current and acting to rotate the disc relative to the magnet.

The driving torque acts against two control spings 16, 17, operatively connected with the shaft, and providing the means whereby the rotor winding may be connected with an input circuit 18.

The rotor disc also carries an annular metallic conductive coating 19 which co-operates with the flux in the air gap so as to provide eddy current damping of the rotor, the damping or retarding torque exerted on the rotor disc being dependent on the flux of the magnet, and the resistivity of the metallic conductive coating. In so far as the resistivity of this metallic coating is dependent on the ambient temperature, the retarding torque exerted on the disc is likewise dependent on the ambient temperature, the retarding torque decreasing with increase in ambient temperature when the conductive coating has a positive temperature coefficient of resistance.

The input circuit 18 provides means for connecting the rotor winding 15 with a source 20 of a unidirectional signal current which is dependent on a voltage or current which is to be monitored by the relay. The relay is intended to indicate by means of the operation of electrical contact means (not shown) operatively connected with the rotor member the existence of an abnormal value of the voltage or current that is being monitored.

The input circuit 18 includes a parallel circuit combination, comprising a solid state diode 21 and a linear resistor 22, for connection between a positive input terminal 24a and the upper control spring 16 of the rotor member. The input circuit 18 also includes a by-pass electrical circuit 23 connected between the positive input terminal 24a and a negative input terminal 24b, this circuit including in series relationship with each other, a solid state diode 25, a thermistor 26, and a linear resistor 27.

The thermistor 26 is a temperature dependent resistor of which the resistance decreases with increase in ambient temperature. Thus as the ambient temperature increases, the current flowing in the by-pass circuit 23 tends to increase at the expense of the current flowing in the rotor winding 15, so that the proportion of the signal current supplied by the source 20 which flows in the rotor winding 15 progressively decreases with increase in ambient temperature.

The by-pass circuit is arranged so that the component values of the constituent elements reduce the current flow to the rotor winding in a manner which substantially compensates for the inherent variations in the retarding torque of eddy current damping means due to changes in the ambient temperature.

The diode 25 has a non-linear voltage-current characteristic, the effect of which is to suppress the flow of any substantial current in the by-pass circuit until after the voltage developed across the by-pass circuit has risen above a predetermined value just less than the pick-up voltage for the relay. That is to say that the input circuit operates when at a predetermined normal ambient temperature with the diode 25 just beneath the toe of its voltage-current characteristic.

The resistor 22 of the parallel circuit combination is provided so as to limit the flow of current in the rotor winding to a low value. The diode 21 on the other hand is arranged to decrease its resistance as the voltage applied to the input terminals 24a and 24b increases, so that a substantial increase in the rate of increase of rotor winding current occurs when the voltage applied to the input terminals rises to a predetermined pick-up value.

What I claim as my invention and desire to secure by Letters Patent is:

1. An electrical protective time/overcurrent relay comprising a stationary constant magnetic flux producing means, a rotor co-operating with the said flux producing means and carrying a driving winding means connected with relay input terminals to receive a unidirectional electric current for exerting on the rotor a driving torque by virtue of interaction of such electric current and a magnetic flux produced by the said flux producing means, a braking winding means comprising an electrically conducting member for exerting on the rotor a braking torque by virtue of interaction of eddy currents induced in the said conducting member on movement of the rotor and a magnetic flux produced by the said flux producing means and relay contact operating means, relay contact means operable by the relay contact operating means on rotation of the rotor into a predetermined "operated" position, and ambient temperature compensating means for compensating variations in braking torque arising from ambient temperature variations, wherein the ambient temperature compensating means comprises an electric shunt circuit connected in parallel with the driving winding means and including an ambient temperature dependent resistance device for automatically varying the proportion of a relay input current supplied to the relay input terminals which is supplied to the driving winding means in dependence upon the ambient temperature in a manner similar to that in which the braking torque varies with variation in ambient temperature.

2. An electrical protective time/overcurrent relay according to claim 1, including a non-linear resistance device connected in the said shunt circuit for preventing the flow of any appreciable current in the said shunt circuit except when the relay input current exceeds a predetermined "pick-up" value at which rotation of the rotor from a starting position just commences.

3. An electrical protective time/overcurrent relay according to claim 2, including in series with only the driving winding means a linear resistor for matching the voltage appearing across the said shunt circuit at the said pick-up value of relay input current to the voltage required across the said shunt circuit to cause the said non-linear resistance device to change from a state of high resistance to one of low resistance, and in parallel with the said linear resistor a non-linear resistance device for limiting the voltage that may be developed across the linear resistor whereby to restrict the burden of the relay for values of relay input current substantially greater than the said pick-up value, this second-mentioned non-linear resistance device exhibiting a high resistance value until the relay input current exceeds the pick-up value, and thereafter exhibiting a lower resistance value so long as the relay input current pick-up value is exceeded.

References Cited

UNITED STATES PATENTS

| 1,961,940 | 6/1934 | O'Hagan | 317—52 X |
| 2,284,423 | 5/1942 | Hansell | 317—41 X |

MILTON O. HIRSHFIELD, *Primary Examiner.*

J. D. TRAMMELL, *Assistant Examiner.*